July 7, 1970  B. L. HOLM ET AL  3,519,310
METHOD AND APPARATUS FOR FLUIDIZING ACTIVATION OF
PARTICULATE, GRANULAR, VISCOUS AND
SIMILAR MATERIALS
Original Filed July 11, 1967  7 Sheets-Sheet 1

FIG. 1

INVENTORS
BENGT LENNART HOLM
SVEN IVAN ARVID TORNMARCK
BY 
ATTORNEY

3,519,310
METHOD AND APPARATUS FOR FLUIDIZING ACTIVATION OF PARTICULATE, GRANULAR, VISCOUS AND SIMILAR MATERIALS
Bengt Lennart Holm and Sven Ivan Arvid Tornmarck, Malmo, Sweden, assignors to Kockums Mekaniska Verkstads Aktiebolag, Malmo, Sweden
Continuation of application Ser. No. 652,538, July 11, 1967. This application Nov. 22, 1968, Ser. No. 788,111
Claims priority, application Sweden, July 14, 1966, 9,632/66
Int. Cl. B65g 53/04
U.S. Cl. 302—29       20 Claims

ABSTRACT OF THE DISCLOSURE

System for fluidizing and agitating material by introducing modulated gas into the material to reduce the internal friction thereof.

This application is a continuation of pending application Ser. No. 652,538, filed July 11, 1967, now abandoned, entitled Method and Apparatus for Fluidizing Activation of Particulate, Granular, Viscous and Similar Materials.

This invention relates to the activation of particulate, granular, viscous and similar materials and more particularly to a novel and improved system for reducing the internal friction of such materials in order to agitate the material or to facilitate the flow thereof when removing material by gravity from containers and other storage spaces and when transporting material by gravity along slip planes and chutes. The system according to the invention is useful among other things for efficient removal of cement, chalk, starch, sand and other different types of particulate and granular materials as well as mortar, concrete and other different types of viscous materials from containers, such as tanks, drums, silos and the like.

Economical aspects impose the necessity of removing and transporting materials rapidly, e.g. when unloading and loading vehicles and vessels, and also of exploiting the maximum capacity of a generally cylindrical, spherical, or parallelepipedonal storage space to be emptied.

Many systems have heretofore been suggested for a rapid emptying of containers such as the use of air under pressure to act upon the material so that there is added to the weight thereof a force directed toward a discharge opening, which is generally located at the container bottom, and the use of vacuum which acts in a similar manner. In these prior art systems it is inevitable that the material is restrained to a certain extent during emptying because of the internal friction of the material, i.e. in a particulate or granular material the friction between the particles or granules thereof, particularly in a zone in the immediate vicinity of the discharge opening.

Another difficulty heretofore encountered with known systems utilizing compressed air for emptying containers is the effect known as the "rat hole effect." When compressed air is introduced into the bottom of a container having an outlet, the particulate material immediately above the outlet will begin to flow therethrough. This process continues until a vertical hole is formed above the outlet whereupon the compressed air merely flows beneath the material and into the outlet without functioning to remove further material from the container.

This invention provides an improved system for fluidizing activation of particulate, granular, viscous and similar materials in order to loosen up the material and thereby to agitate the material or to cause it to flow freely.

According to the invention there is provided a method for the purpose described in the preceding paragraph comprising the steps of blowing gas into the material to loose up the material and modulating the gas by a frequency to reduce the internal friction of the material.

The invention also provides an apparatus for practicing said method comprising means for introducing compressed gas into the material and means for modulating such gas to activate the material and thereby to reduce the internal friction thereof.

The modulation of the gas may be attained by modulating the gas introduced in said material to be activated at one or more frequencies, preferably within the audio frequency band. Frequencies between 100 and 1000 c.p.s. have proved particularly well suited to attain a good effect and a thorough penetration of the material.

In order that the invention may be fully understood, it will now be described with reference to the accompanying drawings in which.

Figure 1:
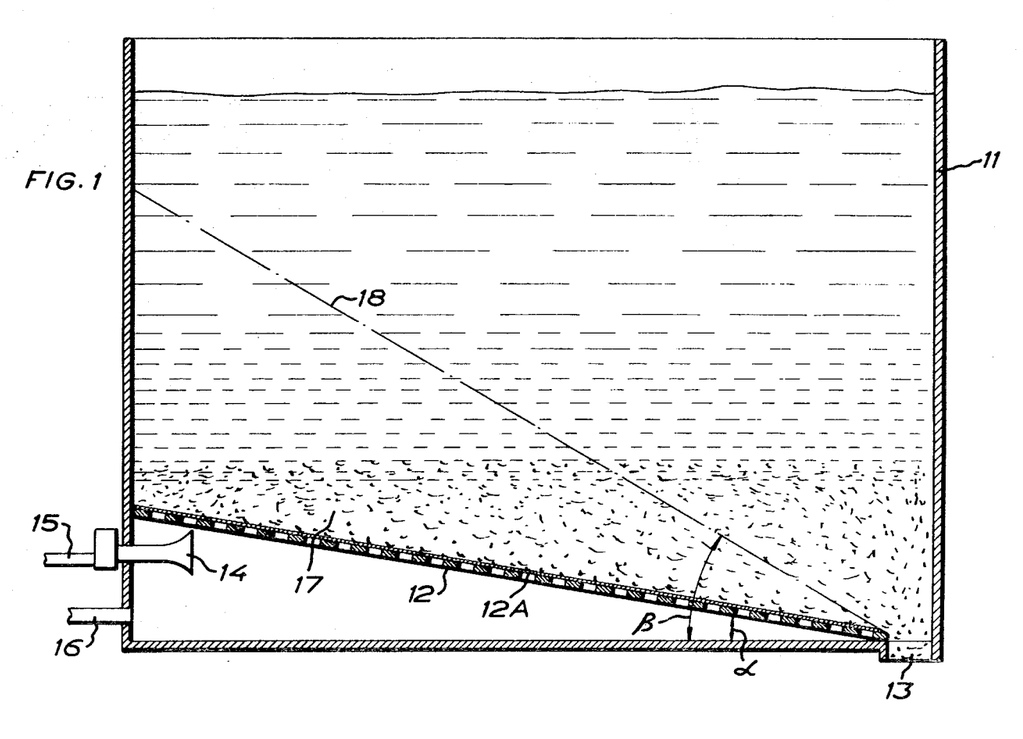
FIG. 1 is a diagrammatical cross sectional view of a container provided with an emptying system according to the invention.

In order to explain the principle of the method according to the invention reference is made to FIG. 1 in the accompanying drawings illustrating diagrammatically one example of apparatus for carrying out the method of the invention. In FIG. 1 there is shown in vertical cross section a storage container 11 of parallelepipedonal form filled with material. Arranged in this container is a perforate slip plane 12 covered with fabric, cloth or like material 12A on the upper side thereof. Slip plane 12 forms the material supporting surface of the container and slopes at a small angle α toward a discharge opening 13 at the bottom of the container for the removal of material therefrom. A high power sound transmitter 14 having a pneumatic diaphragm or reed is mounted on the container and is directed into the interior thereof beneath the slip plane, said sound transmitter being supplied with air under pressure through a pipe 15. An air supply pipe 16 is also connected to the interior of the container beneath the slip plane. However, the provision of air supply pipe 16 is optional.

The air energizing the sound transmitter 14 and existing from the resonance horn or other resonator of the sound transmitter together with air supplied through pipe 16 flows through the air-permeable slip plane 12 and up into the material in the container in a high modulated state created by the sound transmitter producing sound waves having a frequency which is preferably 100 to 1000 c.p.s. By the modulated air thus blown into the material in container 11 such material is fluidized and activated in a bottom layer 17. It is believed that this marked fluidizing and activating effect is produced by the modulation of the air which is caused thereby to penetrate the material and prevents the bottom layer 17 from compacting even though the particulate material is of the type that is hard to cause to flow by gravity on account of tendency of arc formation as is the case with cement, chalk and starch and other fine grain particulate material. Thus the internal friction of the material activated in the manner described is substantially reduced and the material flows by gravity along the slip plane 12 towards discharge opening 13 to be removed from the container through such opening.

It has been established that with the system according to the invention it is possible to reduce the inclination of slip plane 12 from earlier commonly used values of 20–45° down to about 5°. For comparison the slope angle when emptying is performed by prior art systems has been marked in FIG. 1 by a dash-and-dot line 18. The angle of inclination thereof is designated β. The reduction of the slope angle thus achieved according to this invention affords considerable economical saving by more efficient utilization of the capacity of the container such as silos, mobile containers and cargo holds of vessel and containers of any other type and for different purposes.

It is to be understood that in certain cases sound transmitter 14 or similar modulating means may be used to achieve the desired result without the supplementary supply of compressed air through pipe 16. In other cases it may be desirable to use unmodulated air supply in combination with the air supplied through the sound transmitter the total air flow through air-permeable slip plane 12 being modulated by the sound waves propagating from sound transmitter 14.

Several sound transmitters in parallel may be associated with one and the same container. Generally the gas employed will be pressurized air but the use of other pressurized gas or gas mixture is of course conceivable in special cases, for instance when the material to be emptied from the container is sensitive to the oxygen of the air.

Figure 2:
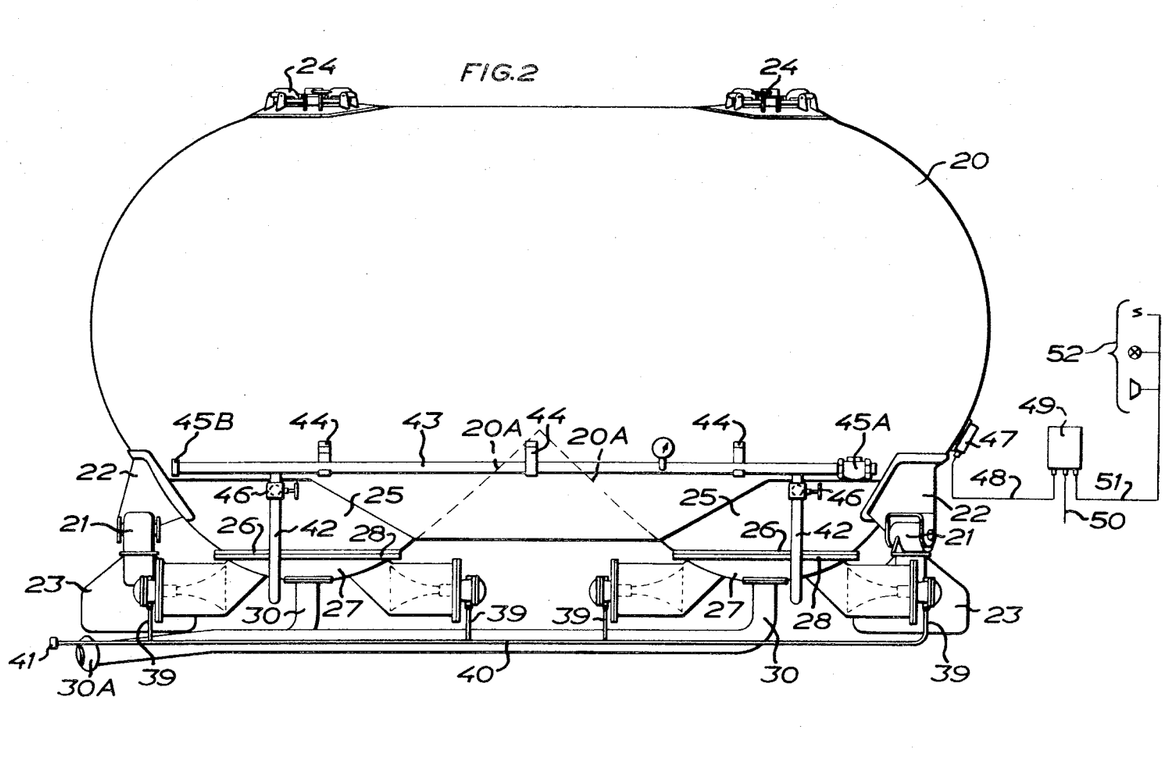
FIG. 2 is a side elevational view of a practical embodiment of a container provided with an emptying system according to the invention.
Figure 3:
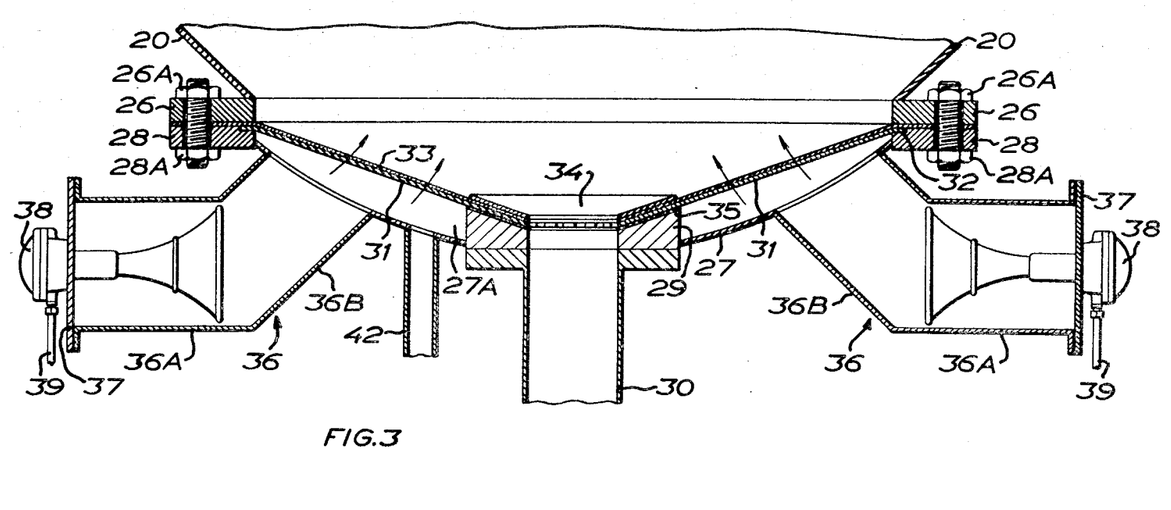
FIG. 3 is an enlarged fragmentary vertical cross sectional view of the container in FIG. 2 at a discharge opening thereof and showing also sound transmitters associated therewith.
Figure 4:
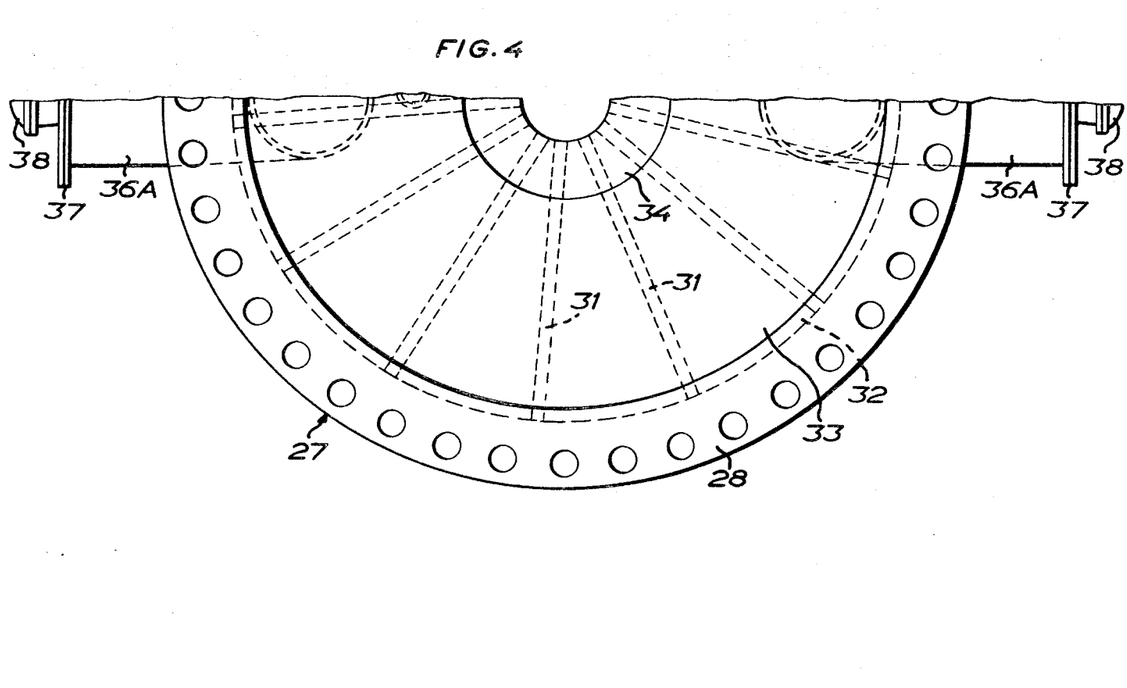
FIG. 4 is a fragmentary plan view of the arrangement shown in FIG. 3.

Referring to FIGS. 2–4 in the drawings a practical embodiment of a container having a system in accordance with the principles explained with reference to FIG. 1 now will be described in more detail. A cylindrical container 20 having substantially hemispherical ends is mounted by shock and vibration absorbing members 21 fitted to the container by brackets 22, on elements 23 supported by a stationary structure or a mobile structure such as a vehicle or a vessel. At the top of the container are provided two conventional fill caps 24. The bottom of the container is provided with two mutually spaced discharge hoppers 25 each arranged adjacent one end of the container and terminating in a circular outwardly projecting flange 26. Slip plates 20A are provided in the interior of container 20 between hoppers 25 to span the horizontal bottom surface of the container. Connected with each hopper 25 is a curved closure member 27 having a circular outwardly projecting flange 28 at the marginal edge thereof, which is secured to flange 26 by stud bolts having upper and lower nuts 26A and 28A respectively. As shown in FIGS. 3 and 4 closure member 27 has a central apertured block 29 forming a central discharge opening of the closure member said opening communicating with a discharge tube 30 secured to block 29. Between block 29 and flange 28 extend a plurality of radial cross bars 31 having flat rectangular cross section the outer ends of said cross bars being received in a circular recess 32 in the upper surface of flange 28. The cross bars are covreed by a layer 33 of fabric, cloth or other similar air-permeable material extending over the upper surface of flange 28 to the outer periphery thereof and clamped at its outer marginal portion between flanges 26 and 28. At their inner ends cross bars 31 and an inner marginal portion of layer 33 define a central opening in said layer, registering with the central opening in block 29, and are clamped between the upper surface of block 29, which forms a conical recess having a bottom sloping toward the central opening formed by said block, and a conical collar 34 secured to block 29 by means not shown, e.g. countersunk screws having their heads flush with the upper surface of the collar and engaging tapped blind holes in block 29. Suitable packing material may be placed between cross bars 31 and block 29 as indicated at 35. Thus it will be seen that each discharge hopper 25 is closed at the lower end thereof by an air-permeable bottom forming a conical slip plane sloping from the peripheral wall of said hopper towards the discharge opening in block 29.

Communicating with space 27A defined by closure member 27, layer 33, flange 28, and block 29, are two tubes 36 having a substantially horizontal branch 36A closed at one end by a plate 37 and an upwardly inclined branch 36B extending from the other end of branch 36A and communicating with space 27A. Plate 37 forms a mounting member for a sound transmitter 38 of the pneumatic membrane or reed type which has the operating mechanism outside said plate and the resonance horn inside the plate and extending along branch 36A. To each sound transmitter is connected an air supply pipe 39, and the plurality of pipes 39 are connected to an air supply manifold 40 having a coupling 41 at one end for connection to an air compressor. Thus it is seen that sound frequency modulated air is supplied by the sound transmitters 38 to the interior of container 20 beneath the air-permeable bottom 31, 33 and passes through said bottom to penetrate into particulate or similar material supported thereby in the container as is indicated by arrows in FIG. 3. The fluidizing activation of the material as described in connection with FIG. 1 thereby is obtained, and the flow of material by gravity towards the central discharge opening thus is facilitated. However, it may be necessary to supply additional air through the material beyond that supplied by the sound transmitters, and for this purpose there is connected to space 27A a pipe 42 which is branched from a manifold 43 supported by container 20 on brackets 44. The manifold is closed at one end by a shut-off valve 45A and is provided with a coupling 45B at the other end to be connected to the air compressor. The communication between manifold 43 and each pipe 42 is regulated individually by a valve 46. As explained in connection with FIG. 1 the additional air supplied through pipes 42 is modulated by the sound waves propagating from the sound transmitters and contributes to the fluidizing of the material. The material entering the discharge opening in block 29 is carried by air flow from container 20 through pipe 30 communicating with said opening. Pipes 30 join to have a common outlet 30A provided with coupling means for the connection of pipe, hose or similar conduit means.

According to the invention there is provided for the system described with reference to FIGS. 2–4 an electrical indicating circuitry which is schematically shown in FIG. 2 and now will be described with reference to said figure.

On the outer surface of container 20 there is fixed a detector 47 which is sensitive to sound within the frequency range used for the modulation of the activating air and produced by sound transmitters 37, and this detector is adapted to generate an electrical signal in response to the pick-up of sound within said range. Detector 47 is connected by a line 48 to a device 49 controlled by the electric signal generated by the detector e.g. an amplifier or a relay which is supplied with electric power by a line 50 from suitable power source not shown in the drawing. Device 49 is connected by a line 51 with suitable indicating apparatus 52 which may include an audio indicator such as a bell or a horn, a visual indicator such as a lamp, or a coil controlling an indicator of any other type as is shown diagramatically in FIG. 2. Detector 47 and/or device 49 provide a threshold function, i.e. a signal is transmitted to indicating apparatus 52 only when the sound picked up by detector 47 is of an intensity greater than a predetermined value. This threshold value may be determined by the characteristics of the detector which may be an electromechanical or electronic transducer, or by the characteristics of device 49. When container 20 is more or less filled with material and is being emptied, the sound produced by sound transmitters 38 is picked up by detector 47 and is attenuated by the bulk of material supported by bottom 31, 33. The threshold value of the indicating circuitry may be adjusted in such manner that no indication is given when the detector picks up sound that has been attenuated by the bulk of material. However, when the container is empty or substantially empty there is little if any material stored in the container, between the sound transmitters and the detector which means that the sound picked up by the detector will have a relatively greater intensity when the container is empty or is about to become empty. Thus, it is possible to adjust empirically the threshold value of the indicating system so as to produce an indication only when the container is empty or is about to become empty.

As will be seen, the indicating circuitry described above and disclosed in FIG. 2 provides simple means to indicate a substantially empty condition of the container. This circuitry may be applied to the container without it being necessary to intrude upon the space in the container or to pierce the wall thereof. If desirable the signal supplied by detector 47 may be transmitted over a telephone line for remote control purposes.

Figure 5:
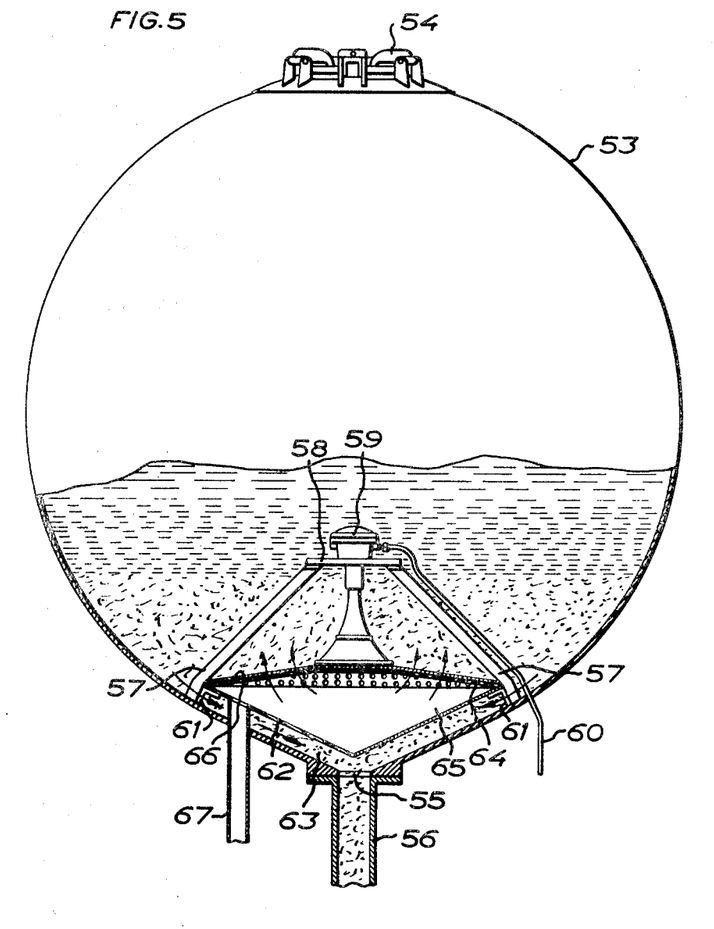
FIG. 5 is an elevational view, partly in vertical cross section, of a container provided with an emptying system according to the invention showing a modified sound transmitter arrangement.

The embodiment according to FIG. 5 comprises a substantially spherical container 53 of a common type having a fill cap 54 providing a central discharge opening 55 at the bottom thereof, a discharge tube 56 being connected to said opening. Means for mounting the container movable or stationary may be provided e.g. as shown in FIG. 2. In the interior of the container there is provided a supporting structure consisting of an annular set of inclined legs 57 connected to the container at their lower ends and converging towards their upper ends, and a horizontal platform 58 connected to said legs at their upper ends. Supported by the supporting structure is a sound transmitter 59 of the pneumatic membrane type having an air supply pipe 60 extending to the exterior of the container to be connected to an air compressor. A set of several sound transmitters may be provided if desired. As will be seen in the drawing the sound transmitter has the operating mechanism disposed on the upper side of the platform, the resonance horn being disposed below the platform and extending axially on the vertical central axis of the container towards the discharge opening 55. On brackets 61 secured one on each leg 57 at the lower end thereof is mounted an inverted conical metal sheet member 62 which is arranged coaxially with the discharge opening of the container the tip or apex thereof being directed towards the discharge opening. The lower surface of member 62 defines together with the inner surface of the bottom of the container a conical space 63 surrounding discharge opening 55 and having a bottom sloping down towards such opening. The upper side of member 62 forms a cup which is covered by a perforate metal cover plate 64 joining the marginal edge of conical member 62 and defining a space 65 together with said member. Cover plate 64 is provided with a layer 66 of cloth, fabric or similar material on the upper side thereof. As is realized the perforated cover plate may be substituted by a cross bar structure as that disclosed in FIGS. 3 and 4 extending between and supported by the resonance horn of sound transmitter 59 and the marginal edge of member 62. Preferably there is arranged in the cover plate and the layer thereon a central opening registering with the outlet opening of the resonance horn of sound transmitter 59 in order that the perforate plate and the layer thereon will not attenuate the sound produced by the sound transmitter. A tube 67 extending through the wall of the container is connected to space 65 and provides for the supply of unmoduated air to said space.

As will be seen the system disclosed in FIG. 5 will operate in the same manner as those of FIGS. 1–4 and in accordance with the principles of the invention. When the container is to be emptied the material therein is activated and fluidized by air supplied through sound transmitter 59 and tube 67 into space 65 and modulated by sound frequency waves propagating from the sound transmitter. The modulated air passes through perforate plate 64 and layer 66 and penetrates into the material supported thereon, as is indicated by arrows in FIG. 5. Thus the internal friction of the material in the container is reduced in the manner earlier described herein and the material will flow easily by gravity through space 63 towards the discharge opening 55 into discharge tube 56 as is also indicated by arrows in FIG. 5.

The embodiment disclosed in FIG. 5 and described above has the advantage that the sound transmitter or a plurality of sound transmitters arranged inside the container are surrounded by the material in the container when filled. This means that the sound produced by the sound transmitter or transmitters is attenuated by the surrounding material, the sound level in the immediate surroundings of the container thereby being reduced. Further, the sound activating system is out of the way when disposed inside the container which is substantially free of external apparatus for emptying the container.

In the embodiment of FIG. 5 an indicating circuirty as that disclosed in FIG. 2 may be provided.

The application of the inventive concept for the purpose to fluidize material so as to cause it to flow along a conveying path is illustrated by the embodiment of the invention shown in FIGS. 6 and 7 which will now be described.

A conveying trough or chute having a bottom wall 68 and side walls 69 and presenting a rectangular cross section is provided with longitudinal opposite angle bars 70 secured to side walls 69 by bolts or similar fastening members and spaced from bottom wall 68. Between angle bars 70 extend a plurality of cross bars 71 which may be welded to said angle bars. Supported by the supporting structure provided by angle bars 70 and cross bars 71 are two longitudinally extending lower flat bars 72, and said flat bars together with the projecting flanges of angle bars 70 are connected with upper flat bars 73 by rivets 74 a perforate metal sheet 75 and a layer 76 of cloth, fabric or similar material covering the upper surface of metal sheet 75 being clamped between lower flat bars 72 and upper flat bars 73 and between the projecting flanges or angle bars 70 and upper flat bars 73, respectively. Thus it will be seen that there is provided in the chute an air-permeable material supporting bottom of similar character as those described in connection with the embodiments of the invention of FIGS. 1–5. Bottom wall 69 and air-permeable bottom 75, 76 slope from one end of the chute to the other at an angle α which may be as small as 3°. As is obvious it is necessary that the air-permeable bottom 75, 76 is sloped while, bottom wall 69 may be substantially horizontal. In the space defined in the chute between bottom wall 69 and air-permeable bottom 75, 76 there are mounted three sound transmitters 77 of the pneumatic membrane type having an air supply pipe hsystem 78. The resonance horns of said sound transmitters are disposed longitudinally of the chute and face the lower end thereof. A pipe 79 for the supply of unmodulated air is connected to said space.

Figure 6:
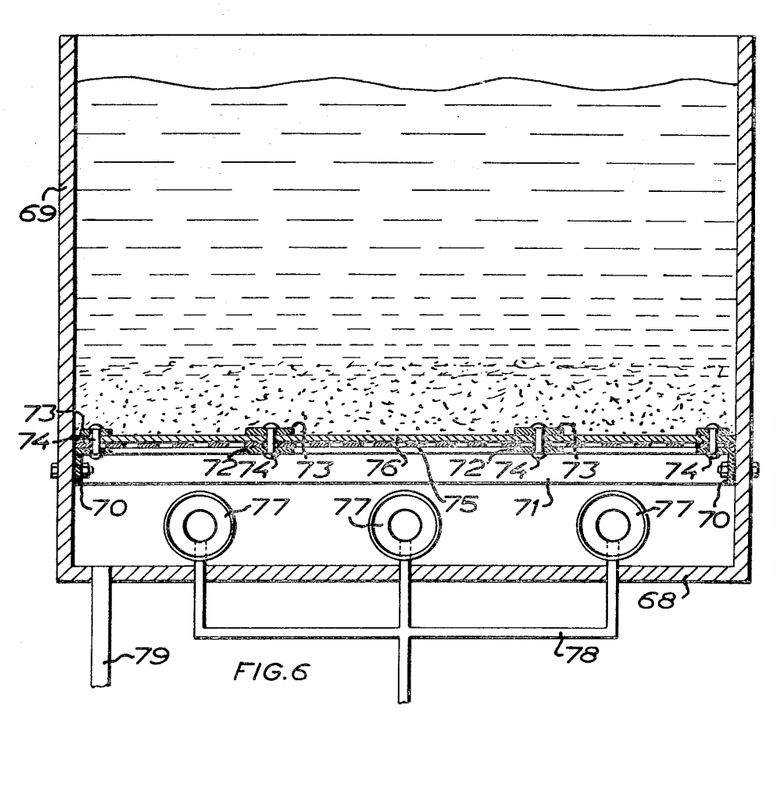
FIG. 6 is a transverse cross sectional view of a conveying chute provided with a material activating system according to the invention.
Figure 7:
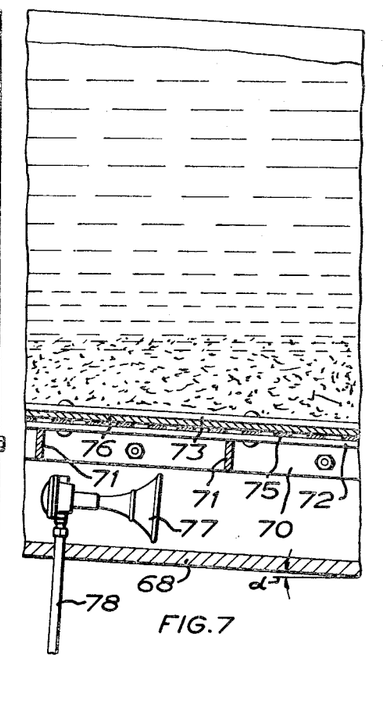
FIG. 7 is a fragmentary longitudinal cross sectional view of the conveying chute shown in FIG. 6.

The sound modulating system associated with the conveying chute of FIGS. 6 and 7 operates in the manner already described to fluidize a bottom layer of material supported by the air-permeable bottom by the penetration of sound modulated air into the material from the space beneath the air-permeable bottom, the modulated air passing through said bottom. Thereby, the internal friction of the material in the chute is substantially reduced and the material may be caused to move by gravity along the chute at a substantially lower sloping angle α than that necessary if modulated air activation of the material were not utilized.

Figure 8:
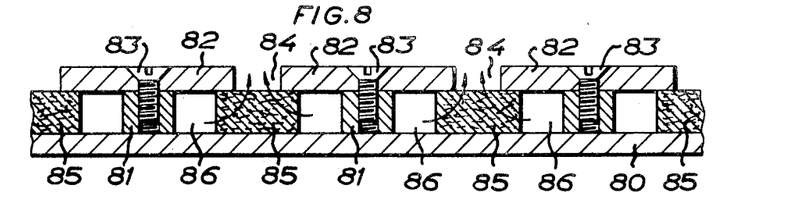
FIG. 8 is a fragmentary cross sectional view of a floor structure forming the material supporting surface of a storage space or a conveying chute.
Figure 9:
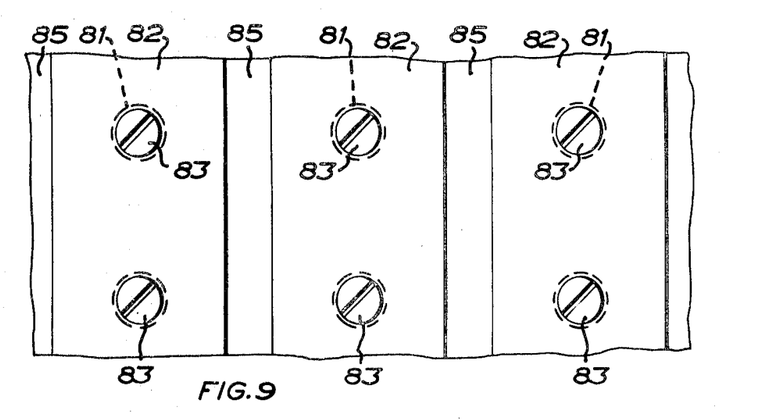
FIG. 9 is a fragmentary plan view of the floor structure in FIG. 8.

There are cases where the sandwich bottom structure shown in FIGS. 6 and 7 is noneconomical especially when the bottom structure is required to support a substantial weight over a great area as is the case in cargo holds of vessels. In such cases the structure disclosed in FIGS. 8 and 9 may be preferred. According to these figures there is provided a bottom wall 80 which may be existing bottom wall structure of a cargo hold, the bottom wall of the chute according to FIGS. 6 and 7 or other similar supporting structure. Secured as by welding to the upper surface of bottom wall 80 are a plurality of internally tapped cylindrical sockets 81 arranged in parallel rows. Flat bars 82 are secured to said sockets by screws 83 which are ecrewed into the sockets and have their heads flush with the upper surface of the flat bars. These flat bars are parallel with sach other and with the bottom wall and have adjacent longitudinal marginal edges mutually spaced to form longitudinal slots 84. Longitudinal strips 85 of an air-permeable material such as felt e.g. polypropylene-polycarbonate felt or similar material are clamped between flat bars 82 and bottom wall 80 and may be cemented to the bottom wall if necessary. These strips extend transversely over slots 84 and define together with flat bars 82 and bottom wall 80 longitudinal spaces 86. Pressurized air may be introduced into said spaces and may be sound modulated in the manner earlier described herein and such air escapes from the spaces through the air-permeable strips as indicated by arrows in order topener tate into material supported by the supporting surface formed by flat bars 82 and felt strips 85 and to activate such material. The bottom may slope towards a discharge opening or other dishcharge means.

Although the invention has been described with regard to the fluidizing of material in order to facilitate the flow of the material in connection with the removal or transport thereof it is contemplated that the system according to the invention may be applied in cases wherein flow of material is not required but the material has to be agitated to prevent compaction on the supporting surface.

The modulation of the air may be achieved by modulating the air before penetrating into the material to be activated as in the examples shown and described herein. However, it is possible to modulate the air or other gas penetrating into the material by enclosing the surface in which pressure modulations are produced, the air or other gas penetrating into the material is thus modulated by the modulated back pressure encountered thereby.

It is readily understood by those skilled in the art that the invention is not limited to practicing the method with the aid of the apparatus illustrated herein and that the invention can be carried into effect by other means within the scope of the appended claims.

What is claimed is:

1. The method for fluidizing particulate, granular viscous and similar materials comprising the steps of blowing a modulated gas into said material to loosen the material and modulating the gas by a frequency to reduce the internal friction of the material, said modulating frequency being at least one frequency in the sound frequency range.

2. The method according to claim 1 wherein at least part of said gas is passed through a pneumatic sound transmitter as a gas for driving said transmitter to modulate said gas.

3. The method according to claim 2 wherein unmodulated gas is admixed with said modulated gas.

4. The method according to claim 1 wherein said modulating frequency is in the range of 100 to 1000 cycles per second.

5. Apparatus for fluidizing particulate, granular, viscous and similar materials comprising a container for holding said material and having an outlet, supplying means for introducing gas into said material to loosen the material, modulating means for modulating at least a portion of said gas at a frequency to reduce the internal friction of said material, a sound responsive detector associated with said container and operable to detect said modulating frequency produced within the container, and indicating means operatively connected to said detector.

6. The method for fluidizing particulate, granular viscous and similar materials comprising the steps of blowing gas into said material to loosen the material, diverting at least part of said gas prior to its entrance into said material, mechanically modulating the diverted part of said gas by resonance at a sound frequency and then directing said modulated gas into said material to loosen the material and cause it to attain a highly activated fluidized state.

7. The method according to claim 6 wherein said gas is mechanically modulated at at least one frequency in the sound frequency range.

8. The method according to claim 6 including the step of supporting said material on a surface pervious to gas and then directing at least part of said gas through said gas pervious surface.

9. The method according to claim 8 wherein said surface is inclined to effect the flow of material thereover.

10. Apparatus for fluidizing particulate, granular, viscous and similar materials comprising supplying means for introducing gas into said material for loosening said material, means for modulating at least a portion of said gas prior to entrance into said material, said modulating means including a horn having an acoustic resonator therein for modulating the gas passing therethrough, and means directing said modulated gas into said material to loosen and thereby fluidize said material.

11. Apparatus according to claim 10 wherein said material is supported on a gas permeable bottom structure and said supplying means introduces said gas into said material through said bottom structure.

12. Apparatus according to claim 11 including discharging means and wherein said bottom structure slopes toward said discharging means.

13. Apparatus according to claim 11 wherein said modulating means is disposed beneath said bottom structure.

14. Apparatus according to claim 11 wherein said apparatus includes a container in which said material is disposed, said container includes an outlet and said bottom structure forms at least a portion of the bottom of said container and slopes toward said outlet.

15. Apparatus according to claim 14 wherein said modulating means is disposed beneath said gas permeable bottom structure.

16. Apparatus according to claim 14 wherein said modulating means is disposed within said container.

17. Apparatus according to claim 12 including a container for said material, said container including an outlet, a gas impervious bottom in said container spaced below said gas permeable bottom structure and said supplying means introduces gas into said material through the space between said gas permeable bottom structure and said impervious bottom.

18. Apparatus according to claim 17 wherein said gas permeable bottom structure slopes toward said outlet.

19. Apparatus according to claim 11 wherein said gas permeable bottom structure comprises substantially rigid supporting means having openings therein for the passage of gas therethrough and a gas permeable material overlying said openings.

20. Apparatus according to claim 17 wherein said impervious bottom includes a plurality of spaced members extending upwardly therefrom and said gas permeable bottom structure spans said members and is supported thereby.

References Cited

UNITED STATES PATENTS

| | | | |
|---|---|---|---|
| 2,805,896 | 9/1957 | Yellott | 302—29 |
| 2,873,890 | 2/1959 | Starkenberg | 222—136 |
| 2,924,489 | 2/1960 | Beckmann | 302—29 |
| 2,957,727 | 10/1960 | Allen et al. | 302—35 |

ANDRES H. NIELSEN, Primary Examiner

U.S. Cl. X.R.

222—136; 302—35